United States Patent [19]
Sygnator

[11] 3,786,713
[45] Jan. 22, 1974

[54] CHIP BREAKER DRILL SCREW
[75] Inventor: Henry A. Sygnator, Arlington Heights, Ill.
[73] Assignee: Illinois Tool Works Inc., Chicago, Ill.
[22] Filed: Oct. 15, 1971
[21] Appl. No.: 189,572

[52] U.S. Cl............................................. 85/41, 85/47
[51] Int. Cl............................................. F16b 25/00
[58] Field of Search... 85/47, 41; 408/227, 229, 230

[56] References Cited
UNITED STATES PATENTS
2,479,730   8/1949   Dewar................................... 85/47
1,638,230   8/1927   Alsaker................................. 85/47
2,981,127   4/1961   Ransom.............................. 408/229
2,322,894   6/1943   Stevens.............................. 408/230
2,769,355   11/1956  Crisp.................................. 408/230
2,404,048   7/1946   Gepfert.............................. 408/228

Primary Examiner—Edward C. Allen
Attorney, Agent, or Firm—Robert W. Beart et al.

[57] ABSTRACT

A drilling and thread cutting screw having a drill point including generally concave surfaces forming flutes therein with discrete obstructions formed on the concave surfaces to effectively break chips produced by cutting edges in the drill point.

3 Claims, 4 Drawing Figures

PATENTED JAN 22 1974 3,786,713

INVENTOR.
Henry A. Sygnator

His Att'ys

CHIP BREAKER DRILL SCREW

This invention relates to a drill screw and/or particularly relates to a screw which is adapted to break or effectively reduce the size of chips formed by cutting edges.

These screws, having points enabling drilling and thread cutting operations to be performed in one operation, are becoming increasingly popular. Certain applications of drill screws also require a sealed joint or require a fastening which is resistant to corrosion. The drilling operation performed by such screws may at times produce chips which are deleterious to sealing and/or corrosion resistant functions. For example, relatively large lengths of chips may curl upwardly during the drilling operation and become situated beneath the bearing surface of the screw head. Subsequent turning or torqueing of the screws with the chip beneath the head may mar the finish of the workpiece or harm the sealing integrity of sealant or sealing washers which may be associated with the fastener.

It is accordingly an object of the present invention to provide a drilling and cutting screw in which the chips will be broken into small pieces.

It is another object of the invention to provide a drilling and thread cutting screw which will deteriorate the chips produced in the drilling operation without impairing the cutting ability of the screw.

A further important object of the present invention is to provide a chip breaking drill screw which is relatively efficient in operation and can be readily mass-produced.

Still another object and advantage of the present invention is provided in a drill screw having a threaded shank, driving head means and drilling point. The drilling point includes flute surfaces oppositely disposed at the entering end of the shank and formed from relatively concave surfaces which include protrusions or depressions formed therein to effectively decrease the radius of curvature of a chip, thus, tending to break the chip into relatively small pieces.

DETAILED DESCRIPTION OF THE INVENTION

Figure 1:
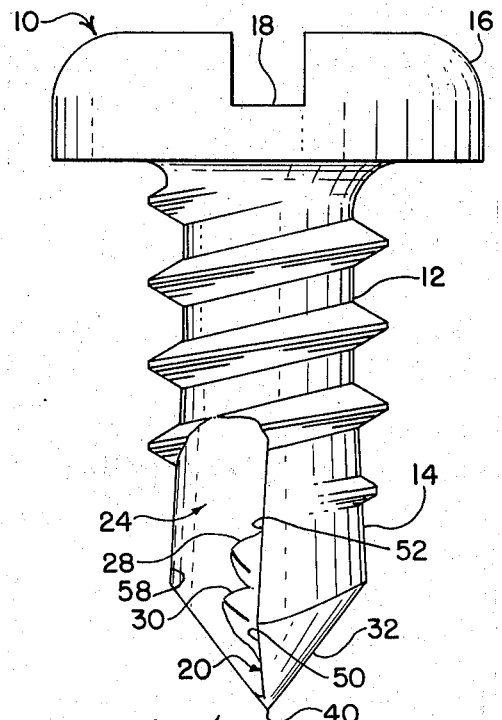
FIG. 1 is an elevational view showing a screw incorporating features of the present invention.
Figure 2:
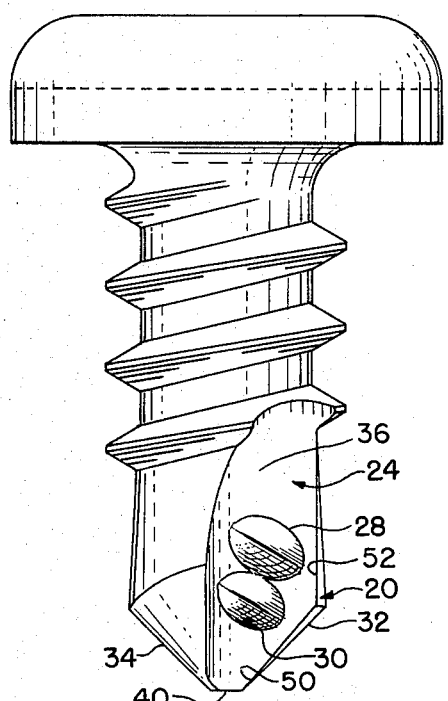
FIG. 2 is a view similar to FIG. 1 showing the screw turned ninety degrees from the position shown in FIG. 1.

As shown in FIGS. 1 and 2, a drilling and thread cutting screw 10 is provided with a threaded shank portion 12, a driving head 16, having suitable driving tool accommodating means 18 and entering or drilling tip 14.

The drilling tip may be formed by forging or pinch-pointing techniques and includes a pair of oppositely disposed flutes 24 and 26, each formed from generally concave surfaces 36 and 38. The drilling tip tapers to a tip edge 40 and the oppositely disposed flutes 24 and 26 intersect the surfaces of the entering tip to form a pair of oppositely disposed cutting edges 20 and 22 and drag or trailing edges 58 and 60. The cutting edge 20 may further be described as including a radially outwardly and axially rearwardly flaring cutting edge 50 and a generally longitudinally extending cutting edge portion 52 which is an extension of cutting edge portion 50. Likewise, cutting edge 22 includes a radially outwardly and axially rearwardly flaring cutting edge portion 54 and a longitudinally extending cutting edge 56. End surfaces 32 and 34 of the tips are disposed between the flute surfaces, the intersection of the flute surfaces and these end surfaces forming the cutting edges 50 and 54.

In order to increase the effectiveness of the cutting action of edges 20 and 22, the end surfaces 32 and 34 are relieved behind these edges to avoid interference with the work.

Figure 3:
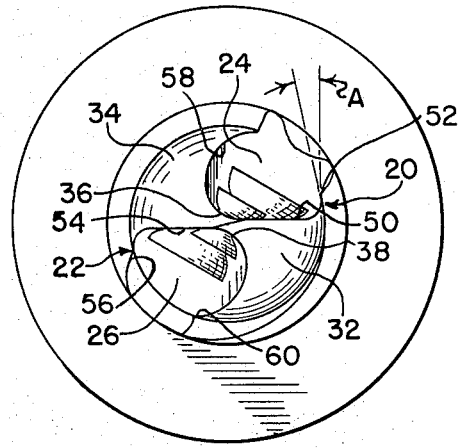
FIG. 3 is the entering end view of the screw shown in FIGS. 1 and 2.

Located inwardly from the cutting edges 20 and 22 are protrusions or bumps 28 and 30. As shown in FIG. 3, these obstructions 28 and 30 extend radially outward from generally concave or rounded surfaces comprising the surface of the flutes 24 and 26. The protrusions 28 and 30 are preferably placed slightly inward of the cutting edges to allow the edges to efficiently cut or drill the material and yet provide a means in the flute to subsequently break or deteriorate the chips due to substantially decreasing the radius of the curled chips to the point where they break and, therefore, are not allowed to eject upwardly. While the obstructions 28 and 30 are placed away from the cutting edges, they are still close enough to the edge to break the chips before they become relatively long or large enough to become placed beneath the bearing surface of driving head 16.

As shown in the drawings, the obstructions 28 are generally oblong in shape and are positioned in the flute with the longest dimension of the oblong obstruction extending generally transverse to the flutes and to the longitudinal axis of the fastener. The surface of the obstruction is shown, and may be further described, as being a surface of revolution of an ellipse which intersects the concave surface of the flute. In actual practice, a 8 – 18×7/16 screw with a forged drilling tip will have chip breaking obstructions, in accordance with this invention, which are approximately one thirty-second inch wide by three sixty-fourths inch long by one sixty-fourth inch high in the flute of the drilling tip which has a diameter of approximately 0.126 inch. The first obstruction 30 is preferably located one-sixteenth inch from the tip of such a screw while the second obstruction 28 is preferably located three thirty-seconds inch from the tip of such a screw. It will be apparent that such obstructions can readily be formed in the same forging step that the drilling tip is formed.

The obstructions 28 and 30 are shown to be small relative to the dimension of the flute surfaces. This enables forging or pinch-pointing technology to be utilized without harming or significantly altering the structural and functional characteristics of flutes such as 24 and 26. Pursuant to the invention, a plurality of discrete, relatively small obstructions are formed on the flute surface, which will provide a number of obstructing surfaces acting on a chip produced at any portion of the cutting edges 20 or 22. These plurality of obstructing surfaces may be formed at discrete locations in the flute and yet not substantially alter the dies or machinery used in a forging technique.

In use, a chip cut in a workpiece by drilling edges 20 or 22 slides into the curved or concave surface 36 or 38 of the associated flute 24 or 26. The normal gradual curvature of the flute will form the chip into a curl or coil within the structural limits of the chip. As the chip contacts the obstruction 28 or 30, the bend or radius of curvature of the chips is substantially decreased and, consequently, the protrusions in the flute tend to break the chip into small pieces. Thereafter, the small pieces may be discharged or forced downwardly, rather than tending to curl upwardly beneath the head of the screw or otherwise on top of the workpiece.

It should be noted that the cutting edges 20 and 22 may be formed into a rake angle to effectively increase the cutting ability of the drill. This rake angle "A" is shown for illustrative purposes as approximately fifteen degrees. The rake angle may also provide a surface which tends to slightly decrease the radius of curvature of a chip compared to a cutting edge having zero or a nominal rake angle.

Figure 4:
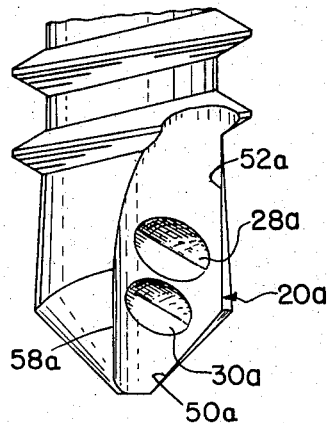
FIG. 4 is a partial elevational view of an alternate embodiment of the screw showing depressions in the flute.

In FIG. 4, there is shown a slightly modified form of the present invention, wherein the obstructions in the flutes 28a and 30a are formed as depressions in the surface rather than obstructions. These depressions 28a and 30a are of the same relative size and location, and have the same general functions, as described above in the preferred embodiment. The chip formed by cutting edges 20a and 22a may be broken in a manner similar to that described above by substantially decreasing the radius of curvature of the curl as it attempts to conform to the relatively steep curvature of the depression or as it abuts the peripheral edges of the depressions 28a or 30a.

While the preferred embodiments have shown two obstruction surfaces formed in each of the opposed flutes, it should be understood that any number of discrete obstructions may be formed in the flute in a variety of combinations and locations and yet come within the spirit and scope of this invention. It will be understood that it is not intended to limit the invention to the preferred embodiments shown, on the contrary, it is intended to cover all alternatives, modifications, and equivalents as may be included within the spirit and scope of the invention as defined by the appended claims.

I claim:

1. A drilling and thread cutting screw comprising a threaded shank, driving tool accommodating means integral with a trailing end of the shank and including a forged drilling portion at the leading end thereof, the drilling portion including first and second oppositely disposed flute means extending generally longitudinally of the shank, outwardly and axially rearwardly flaring entering end surfaces being located between the flute means, each flute means defined by a substantially concave surface intersecting the drilling portion and forming cutting edges and drag edges associated with each flute, the cutting edges associated with each flute including a first cutting edge portion extending outwardly and rearwardly from the extremity of the entering end and a second cutting edge portion, which is an extension of the first cutting edge portion and which extends generally longitudinally of the screw a distance defined by the length of the associated flute means, the concave surface of each flute including at least one discrete obstruction formed thereon adjacent to but slightly inward of each of the first and second cutting edge portions, the discrete obstruction being forged in the flute when the drilling portion is forged, said obstruction being a surface generally oblong in shape with its longest dimension essentially extending transverse of the flute, the surface of the obstruction being a surface of revolution of an ellipse which intersects with the generally concave surface of the flute, thereby providing an impediment to the normal free flow of curling chips serving to break these curling chips into relatively small lengths without impairing the drilling and thread cutting ability of the screw.

2. A drilling and thread cutting screw in accordance with claim 1, wherein the obstructions are a plurality of relatively small depressions in the flute spaced inwardly from the cutting edges.

3. A drilling and thread cutting screw in accordance with claim 1 wherein the obstructions are in the form of a plurality of protuberances extending radially outwardly from the flute surface to sharply increase the bend imparted to a chip, thus tending to break the chip into relatively small pieces.

* * * * *